United States Patent [19]

Takahashi et al.

[11] Patent Number: 5,340,251
[45] Date of Patent: Aug. 23, 1994

[54] SELF-ATTACHING FASTENER AND INSTALLATION DIE

[75] Inventors: Takao Takahashi, Machida; Hiroshi Takehara, Hachioji, both of Japan

[73] Assignee: Multifastener Corporation, Detroit, Mich.

[21] Appl. No.: 11,439

[22] Filed: Jan. 29, 1993

[30] Foreign Application Priority Data

Jan. 31, 1992 [JP] Japan .................... 4-045997
Jan. 31, 1992 [JP] Japan .................... 4-045998

[51] Int. Cl.⁵ .................... F16B 37/04; B23P 11/00
[52] U.S. Cl. .................... 411/179; 411/180; 29/432.2
[58] Field of Search ............... 411/177, 179, 180, 181; 29/432.2, 509, 525.1

[56] References Cited

U.S. PATENT DOCUMENTS

| | | | |
|---|---|---|---|
| 1,648,026 | 11/1927 | Murray | 411/180 |
| 3,648,747 | 3/1972 | Steward | 411/179 |
| 3,810,291 | 5/1974 | Ladouceur | 411/179 X |
| 3,878,599 | 4/1975 | Ladouceur et al. | 29/432.2 |

Primary Examiner—Neill R. Wilson
Attorney, Agent, or Firm—Howard & Howard

[57] ABSTRACT

A pierce nut having a central pilot, a cylindrical flange portion surrounding the pilot and a groove in the flange portion having at least one inclined side wall and a bottom wall having a convex annular protuberance preferably comprising spaced arcuate protuberances extending around the pilot which deforms panel metal beneath the inclined side wall and providing anti-rotation means when the nut is attached to a metal panel. The outer groove side wall includes radial notches or grooves which receive panel metal to provide anti-torque means. The improved die button includes an annular lip having an inside piercing edge spaced from the end to pierce a smaller slug and an annular convex fillet which deforms more panel metal into the nut groove to form a secure mechanical interlock between the nut and panel.

34 Claims, 8 Drawing Sheets

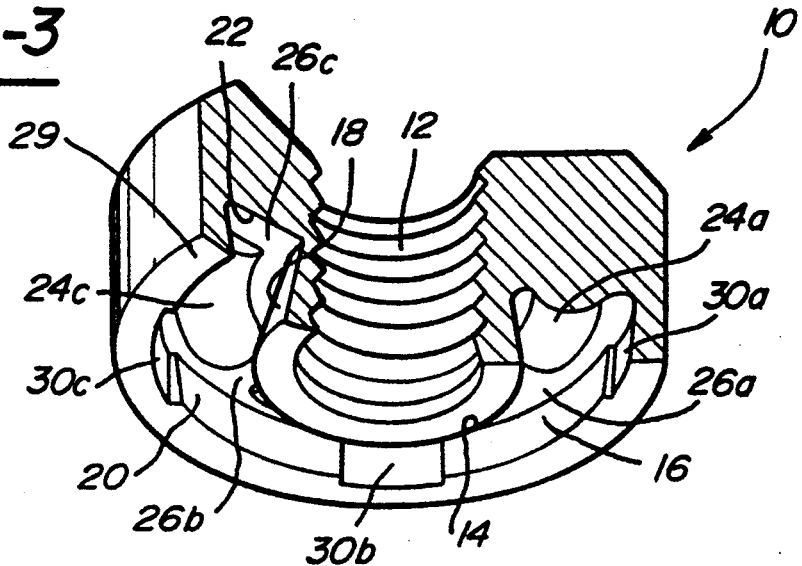
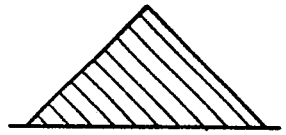 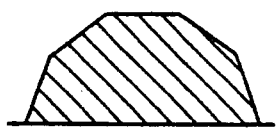 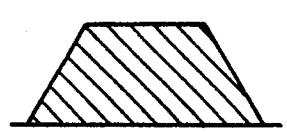
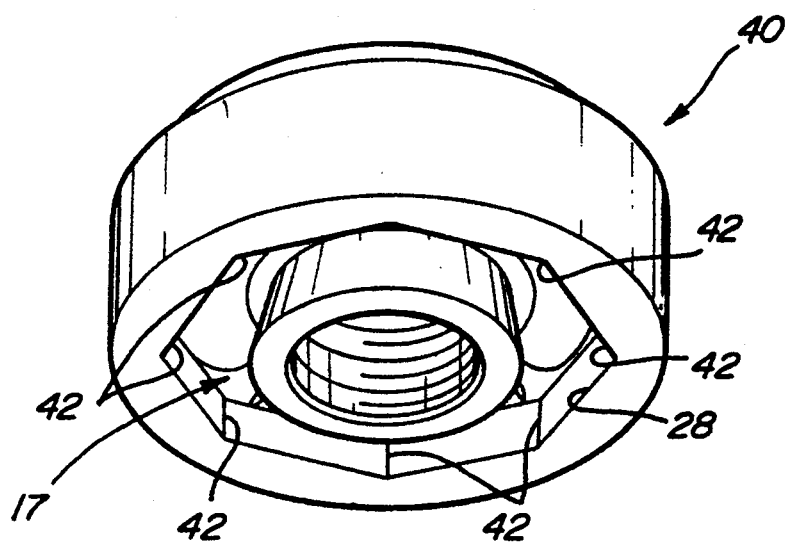

SELF-ATTACHING FASTENER AND INSTALLATION DIE

This invention relates to self-attaching fasteners, such as pierce nuts, utilized in mass production applications and installation tooling, namely an improved die button.

BACKGROUND OF THE INVENTION

Pierce nuts generally include a projecting central pilot portion which pierces the metal panel or plate to which the pierce nut is to be attached and the pilot portion is then received through the pierced panel opening. The nut is then attached to the metal panel by a die member which forms a mechanical interlock between the nut and the panel. The panel may be deformed by the die member into grooves in the nut and/or the nut may be deformed to entrap the panel metal.

Many pierce nuts are used by the automotive industry to assemble cars in which many components of various kinds are attached to metal plates or panels. Pierce nuts are used to attach lamps and sheet metal parts, for example, to the vehicle. When such parts are attached, screws or bolts are threaded into the threaded hole in the pierce nut and the bolt or screw is tightened with rotating tools, such as a torque wrench, at prescribed torque values. The pierce nut must therefore have anti-torque or rotation resistance (the force that keeps the pierce nut from rotating within the metal plate when a bolt is threaded into the pierce nut and tightened) to bind it to the metal plate. After a component is attached to the pierce nut on a metal plates, external forces, such as vibration and tensile forces applied to an automobile, act upon the pierce nuts from the pull-through direction so as to pull them from the metal plate to which they are attached. Therefore, each pierce nut must have sufficient pull-through resistance (the force that keeps the pierce nut from coming out of the metal plate when the pierce nut and a bolt are engaged and the force is applied to the bolt perpendicular to the metal plate) that is stronger than these external forces.

As stated, the torque value of the rotating tool or torque wrench is predetermined, such that the rotation resistance of the pierce nut in the panel should by sufficient to resist this torque value, but the external forces applied to an automobile often cannot be forecast. Therefore, the aforementioned pull-through resistance must be relatively high.

When pierce nuts are being driven into metal plates, the pierce nuts are supplied to the installation tooling continuously through an outlet of a supply device, such as a hopper. Thus, it would be preferred if the shape of the pierce nuts permits free variance of the attachment direction on the surface of the metal plate. In other words, the shape of the pierce nut should permit free variation of the direction that each pierce nut emerges from the outlet of the hopper. In cases in which pierce nuts are to be driven into a metal panel in a number of locations, the pierce nut should be shaped so that the direction of the pierce nut outlet can be freely varied to suit the installation operation.

Pierce nuts have been used commercially in mass production applications for many years. More recently, U.S. Pat. No. 4,690,599 (Japanese patent opening 1983-109710) proposes a square pierce nut having a pilot (FIG. 1, Reference No. 3) used to shear and pierce metal plates. The outside surface of the pilot (Reference 4) is tapered inwardly to improve the pull-out resistance of the pierce nut because the panel metal is forced beneath the tapered wall as shown in FIG. 6. Also, the corners of the nut include a seat face 9 which supports the panel and an inclined side wall 10 which strengthens the interconnection between the panel and the opposed inclined walls.

Even more recently, a cylindrical pierce nut was proposed in Japanese Publication No. 1990-25049. The disclosed pierce nut includes a cylindrical central pilot (Reference 2), which during installation pierces a circular slug from the panel, and the nut includes a circular groove (Reference 6) adjacent the cylindrical pilot. An annular outside wall (4) defines the outside wall of the circular groove which is inclined inwardly to define a restricted opening which improves the pull-out resistance of the pierce nut in the metal plate material with is deformed into the groove. Radiating ribs or irregularities are formed on the panel supporting surface of the annular wall to improve the rotation resistance of the pierce nut in the panel.

The pierce nut proposed in Japanese patent opening 1983-109710 provides sufficient rotation resistance for most applications when sufficient panel metal is forced into the space between the pilot and the outside corners beneath the inclined surface 10. However, the pull-out resistance of this pierce nut depends entirely upon the amount of panel metal forced beneath the inclined side walls as shown in FIGS. 6 and 7. When the pierce nut is attached to a particularly thin metal plate or panel, very little material is forced into this tapered area, with the result that the contact surface between the outside surface area and the panel metal is very small, reducing the pull-out resistance value of the pierce nut. The published value for the pull-out resistance of the pierce nut shown in U.S. Pat. No. 4,690,599 is 83 Kg for a 0.6 mm plate, 106 kg for a 0.8 mm plate and 199 kg for a 1.2 mm plate. Further, because the outside configuration of this pierce nut is almost square, it is not possible to freely alter the direction of the pierce nut from the outlet of the hopper when the direction of the pierce nut attachment to a panel is fixed.

The outside configuration of the pierce nut proposed in Japanese Publication No. 1990-25049 is cylindrical, such that it is possible to freely vary the direction of the pierce nut outlet of the transport device. Further, because panel metal is forced beneath the inclined surface of the external cylinder (FIG. 1, Reference No. 4), substantial panel metal is forced beneath this surface when the panel is thick, strengthening the pull-out resistance of the pierce nut. The published pull-out resistance for this nut is 250 kg with a copper plate having a thickness of 1.6 mm. With thin plates, however, very little panel metal is deformed beneath the inclined surface of the outer wall, substantially lowering the pull-out resistance for this nut, although it is not as low as the pierce nut described above. The advertised pull-out resistance for this nut is 168 kg with a 0.6 mm plate and 208 kg when a 0.8 mm plate is used. Because panel metal is deformed into the radial ribs or irregularities on the panel supporting surface of the outer cylinder, the rotation or torque resistance of the pierce nut is improved. However, this improvement in rotation resistance is substantially greater when a relatively thick plate is used, but the torque resistance falls significantly when the nut is attached to a thinner panel because the contact surface area is reduced. The advertised torque resistance is 255 kg-cm with a 1.6 mm plate, 145 kg-cm with a 0.8 mm plate and 137 kg-cm when the nut is attached to a 0.6 mm plate.

In the automotive industry, which utilizes many pierce nuts, there is a trend toward thinner metal panels and plates to reduce the weight of each car. Thus it is necessary to have pierce nuts shaped to provide the necessary rotation resistance and greater pull-out and pull-through resistance, even when used on thin metal plates. When, for example, it is necessary to achieve pull-out resistance in excess of 200 kg and sufficient rotation resistance to withstand the tightening torque applied by a torque wrench with a 0.6 mm plate and the bolt or screw meets resistance during engagement with the nut, existing pierce nuts of the types described above cannot consistently satisfy these requirements.

As described above, a pierce nut is typically attached to a metal panel or plate in conjunction with an installation die commonly referred to as a die button. The die button includes one or more projecting lips or protrusions configured to be received in the pierce nut groove or grooves. Where the pierce nut has an annular groove, the die button includes an annular lip or protrusion configured to be received in the annular groove of the nut. Where the self-attaching nut is a pierce nut, the die button typically includes a shearing edge or surface which cooperates with the outside surface of the pilot portion of the pierce nut to pierce an opening in the panel. The pierce nut pilot is then received through the pierced panel opening and the lip or protrusion then deforms the panel into interlocking relation with the nut groove or grooves. However, as described above, this mechanical interlock must be sufficient to withstand the torque which may be applied to the nut when a bolt is cross-threaded in the nut and tightened and the nut must have sufficient pull-out and pull-through resistance for commercial applications.

With existing die buttons, the material around the pierced panel opening is deformed by the two surfaces formed by the cylindrical outer surface of the circular lip or protrusion on the die button and the circular back face that is perpendicular to this outer surface and by the outside wall of the circular groove in the pierce nut when the panel metal is inserted into the annular groove. Thus, when insufficient panel metal is deformed by the annular lip of the die button, insufficient panel metal is inserted into the groove and it is not possible to increase the mechanical interlock between the panel metal and the groove to achieve the required pull-out strength. When the panel or plate is particularly thin, the volume of panel metal deformed into the groove is so low that the nut falls off the plate.

Thus, there remains a need for a self-attaching fastener which provides sufficient torque resistance and pull-out/through resistance for automotive applications, particularly for attachment to relatively thin metal panels. The most preferred embodiment is cylindrical, such that reorientation of the nut is not required when the nut is fed to alternative or multiple installation applications. Finally, there remains a need for an improved self-attaching nut installation die button which deforms sufficient panel metal into the nut groove to achieve the required pull-out resistance with a range of panel metal thicknesses, including thin panels.

SUMMARY OF THE INVENTION

Self-attaching fasteners of the type disclosed herein are generally used to pierce a hole in a metal panel or plate and the nut is then attached to the plate by a die button, as described. However, it will be understood by persons skilled in the art that the pierce nut of this invention may also be installed in a panel having a pre-pierced panel opening. The fastener of this invention is self-clinching; that is, the fastener includes an annular groove and panel metal is deformed in the groove to form a mechanical interlock between the panel and the fastener. A self-piercing fastener, however, has several advantages, particularly in mass production applications. For ease of description therefore the self-attaching fastener of this invention will sometimes be referred to as a pierce nut.

As described above, the self-attaching nut fastener of this invention is particularly adapted for attachment to a plastically deformable metal panel. The fastener includes a central pilot portion, a flange portion surrounding the pilot portion having a generally flat annular panel supporting end face and an annular groove defined in the flange end face surrounding the pilot. The groove includes opposed side walls and a bottom wall. In the preferred embodiment, at least one of the groove side walls is inclined toward the opposed side wall to define a restricted or "re-entrant" opening to the groove adjacent the flange end face. The bottom wall of the self-attaching nut fastener of this invention include a convex annular protuberance extending at least partially around the pilot, preferably spaced from the inclined groove side wall. This annular protuberance then directs panel metal beneath the inclined groove side wall as the panel is deformed in the groove against the bottom wall as the nut is attached to the panel. In the most preferred embodiment of the self-attaching nut fastener of this invention, the annular protuberance comprises a plurality of spaced annular protuberances extending around the pilot, and the groove bottom wall between the annular protuberances is located below the plane of the protuberances, providing anti-rotation means for the fastener. In the preferred embodiment, the nut is cylindrical, such that it is possible to freely alter the direction of the pierce nut transfer as described above. In this embodiment, the groove is circular, defining a circular pilot, and the annular protuberance in the bottom wall is comprised of semi-circular protuberances spaced from the side walls of the groove.

In the most preferred embodiment, the self-attaching nut of this invention is self-piercing. The outside edge of the pilot cooperates with the die button to pierce a slug from the panel and the pilot is then received through the pierced panel opening. In this embodiment, the inner side wall of the groove which defines the outer surface of the pilot may also be inclined, defining a relatively sharp piercing edge at the junction of the top of the pilot and the inner side wall. In this embodiment, both of the side walls of the groove are relatively inclined and converge to define a restricted opening to the groove adjacent the flange end face. This wedge-shaped or re-entrant groove provides substantially improved pull-out resistance, particularly in combination with the annular protuberance on the bottom wall. The panel metal is then deformed beneath both inclined side walls by the annular protuberance, forming a very secure mechanical interlock between the panel metal and the nut groove.

The resultant nut and panel assembly then includes a metal panel having an opening therethrough, a fastener having a central pilot portion projecting through the panel opening, a flange portion surrounding the pilot having an annular end face supporting an annular portion of the panel and an annular groove in the fastener annular end face receiving an annular portion of the panel surrounding the panel opening. As described, the bottom wall of the groove includes a convex annular protuberance extending at least partially around the pilot and the panel metal surrounding the panel opening is deformed against the annular protuberance and against the groove side walls. Where the groove side walls are inclined, as described above, the annular panel portion is deformed against the annular protuberance in the bottom wall and beneath the inclined groove wall or walls.

The improved die member or die button of this invention includes a projecting annular lip having an end face, a generally cylindrical outer surface which extends generally perpendicularly from the end face, a flat back face surrounding the annular lip and a stepped convex arcuate annular fillet generally at the junction of the cylindrical outer surface and the back face. As described, the annular lip is configured to be received in the annular groove of the self-attaching nut fastener of this invention and the stepped annular fillet has an outside diameter slightly greater than the inside diameter of the outer side wall of the groove, such that the annular fillet packs panel metal into the groove as the nut is installed in the panel. In the most preferred embodiment, the die member includes a relatively sharp cutting edge spaced below the plane of the end face of the annular lip, such that panel metal is deformed into the nut groove by the end face of the lip prior to shearing and piercing, increasing the amount or volume of panel metal deformed into the groove during installation.

The method of attaching a self-attaching fastener to a panel of this invention then includes locating a panel on the die button and locating the self-attaching nut fastener of this invention on the opposite side of the panel with the annular nut groove coaxially aligned with the annular lip of the die member. The panel is preferably supported on the end of the annular lip. The nut is then driven against the panel, driving the end of the annular lip of the die member, deforming an annular panel portion into the nut groove. Where the nut is utilized as a pierce nut, the shearing edge of the die member then cooperates with the outer edge of the pilot portion of the nut to pierce an opening in the panel. The free end of the pilot is then received through the panel opening as the nut is driven into the panel and panel metal is deformed into the nut groove by the annular lip. The annular convex arcuate fillet adjacent the back face then packs panel metal into the groove as the nut is driven into seating engagement with the die button.

During the final stages of the installation, the panel metal is driven against the convex annular protuberance at the bottom wall of the nut groove, the protuberance then deforms the panel metal radially outwardly and inwardly against the opposed side walls of the nut groove. In the most preferred embodiment, where the groove side walls are inclined, the annular protuberance deforms panel metal beneath the inclined side walls, forming a very secure mechanical interlock between the annular panel portion and the nut groove. Where the nut further includes radial grooves in the outer side wall of the annular groove, panel metal is simultaneously deformed into these radial grooves, improving the torque resistance of the nut in the panel.

Other advantages and meritorious features of the improved self-attaching fastener, nut and panel assembly, method of installation and improved die button of this invention will be more fully understood from the following description of the preferred embodiments, the appended claims and the drawings, a brief description of which follows.

BRIEF DESCRIPTION OF THE DRAWINGS

FIG. 3 is a partially cross-sectioned perspective end view of the pierce nut shown in FIG. 1;

FIGS. 4a–4c are circumferential vertical cross-sectional views of alternative configurations of the annular protuberance in the bottom wall of the groove;

FIG. 5 is a perspective end view of a second embodiment of the pierce nut of this invention;

DESCRIPTION OF PREFERRED EMBODIMENTS OF THE INVENTION

Figure 1:
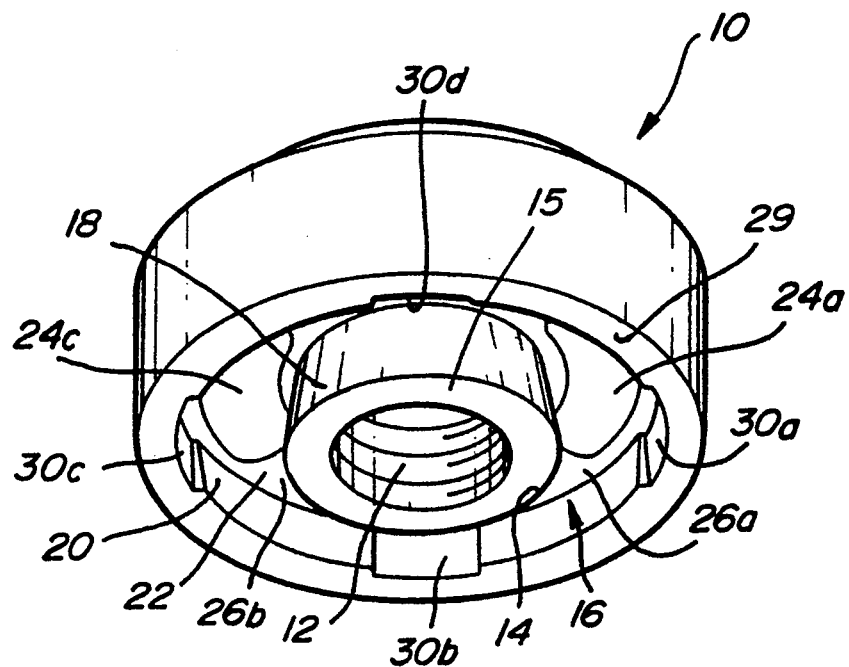
FIG. 1 is an end perspective view of one embodiment of a self-attaching fastener of this invention, namely a pierce nut.
Figure 2:
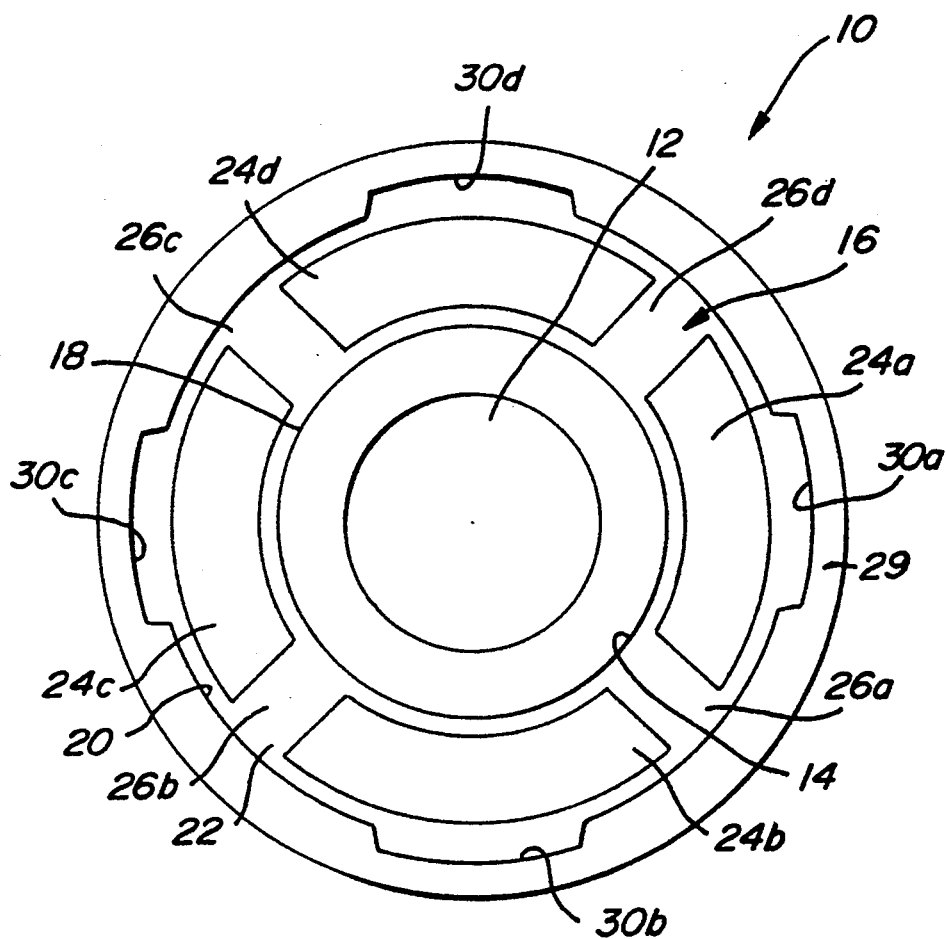
FIG. 2 is an end view of the pierce nut shown in FIG. 1.

The embodiment of the pierce nut 10 illustrated in FIGS. 1–3 is a cylindrical pierce nut whose outside configuration is cylindrical having a circular pilot portion 15 including a threaded bore or screw hole 12 and a circular piercing or shearing edge 14. As described more fully herein, the shearing edge 14 is moved relative to the die button to perforate or shear a metal plate or panel during installation of the nut in a panel. The pierce nut includes an annular flange 29 having an annular groove 16 adjacent the pilot demarcated by opposed side walls 18 and 20 and by bottom wall 22. In this embodiment of the pierce nut, the opposed side walls 18 and 20 of the groove are angled inwardly or relatively inclined, such that the groove narrows toward the groove opening defining a wedge-shaped or re-entrant groove.

In this embodiment, the groove bottom wall includes four arcuate protuberances 24a, 24b, 24c and 24d that extend in the circumferential direction on the central area of the bottom wall 22 of the circular groove 16. As best shown in FIG. 3, the cross-sectional shape of the arcuate protuberances in this embodiment of the pierce nut is arcuate. However, as shown in FIG. 4a–4c, the cross-sectional shape of the arcuate protuberances may be triangular (see FIG. 4a), pentagonal (see FIG. 4b) or trapezoidal (see FIG. 4c). The height of these protuberances in an actual example of this invention made for test purposes is approximately 0.5 mm, but the height can be altered according to the thickness of the panel or plate to which the nut is to be attached. As will be explained below, when a pierce nut 10 is attached to a metal panel or plate, the metal panel material flows both along the sides of the protuberances 24a–24d, the contact surface between the metal plate material and the surface of the circular groove is increased. At the same time, as more panel metal is formed into the wedge-shaped circular groove 16, the metal plate flows into the spaces between the arcuate protuberances, such that the pull-out resistance and the torque or rotational resistance are increased at the same time.

In the embodiment of the pierce nut illustrated in FIGS. 1–3, four radial grooves or notches 30a, 30b, 30c and 30d are formed in the outer side wall 28 of the groove. These grooves or notches lie in almost the orthogonal direction to the circumferential direction of the outside wall 20, opposite the mid portion of the protuberances 24a–24d. As will be explained further below, when the pierce nut is attached to a metal panel or plate, the panel metal flows into the notches to reduce stress and further strengthen the rotational resistance of the pierce nut in the metal panel.

FIG. 5 illustrates an alternative embodiment of the pierce nut of this invention having a polygonal outer side wall 28. As shown, the pierce nut 40 has an annular groove 17 having an octagonal outer side wall. The shape of the other components of the pierce nut may be identical to the pierce nut 10 shown in FIGS. 1–4. The shape of the outer surface 28 of the side wall may be octagonal and inclined, such that panel metal flows into the corners 42 of the octagon to further increase the rotational or torque resistance between the pierce nut 40 and the metal plate to which the nut is attached. The shape of the outer side wall of the groove, however, need not be octagonal; it may, for example, be multi-sided, such as a 16-sided polygon, or the nut itself may be polygonal, including the pilot. The pierce nuts described above may be made by processing round or polygonal bar material on a former, which reduces production costs.

Figure 6:
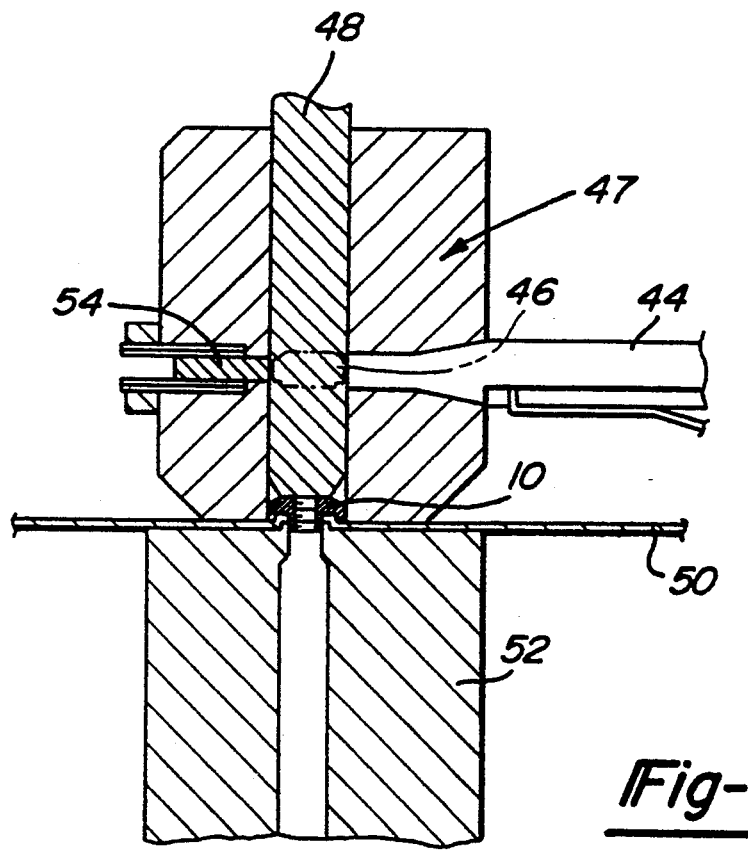
FIG. 6 is a cross-sectioned side view of installation tooling suitable for installing a pierce nut of the type disclosed herein.

FIG. 6 illustrates the general component of the installation tooling which may be utilized to attach a pierce nut 10 to a metal panel or plate 50. As FIG. 6 illustrates, pierce nuts 10 are fed one at a time to the pierce nut receiving area 46 of a pierce nut installation head 47 through transport tube or pipe 44 of a continuous pierce nut supply device, not shown. The nuts are then driven into the metal plate 50 by a plunger 48 which reciprocates in a passage in installation head 47. This operation is performed using a die member 52, commonly referred to as a die button. The die button works in conjunction with the pierce nut 10 to pierce an opening in the metal plate 50 and the die button 52 installs the nut in the panel. To make certain that there is always a pierce nut 10 in the ready location when the plunger 48 is activated, a proximity sensor 54 is normally installed in the passage wall opposite the pierce nut reception area 46.

Figure 7:
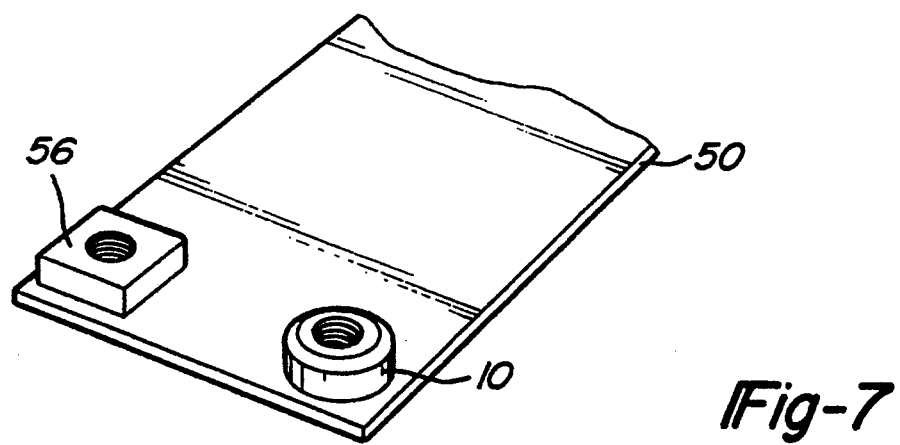
FIG. 7 is a perspective top view of a pierce nut of this invention installed in a metal panel or plate and an older conventional square pierce nut.

FIG. 7 illustrates a pierce nut 10 of this invention installed in a metal panel 50 for comparison to a more conventional square or rectangular pierce nut 56. As described, the pierce nut 10 is preferably cylindrical, such that it is not necessary to take into account the attachment orientation of the pierce nut on the metal plate. When a square pierce nut 56 is used, the orientation of the pierce nut must be considered. Consequently, when a cylindrical pierce nut is attached to a metal panel or plate, the direction in which the die button is installed need not be considered. Thus, the task of aligning the pierce nut with the center of the die button is simplified, which means that a pierce nut supply device with a simple construction can be used. As a result, the overall cost of the pierce nut attachment tooling and feed system is lowered and the reliability of the installation is enhanced using a cylindrical pierce nut. Although presses and dies are generally used for this operation, it is also convenient when a robot is used, because the orientation of the pierce nuts need not be considered.

Figure 8:
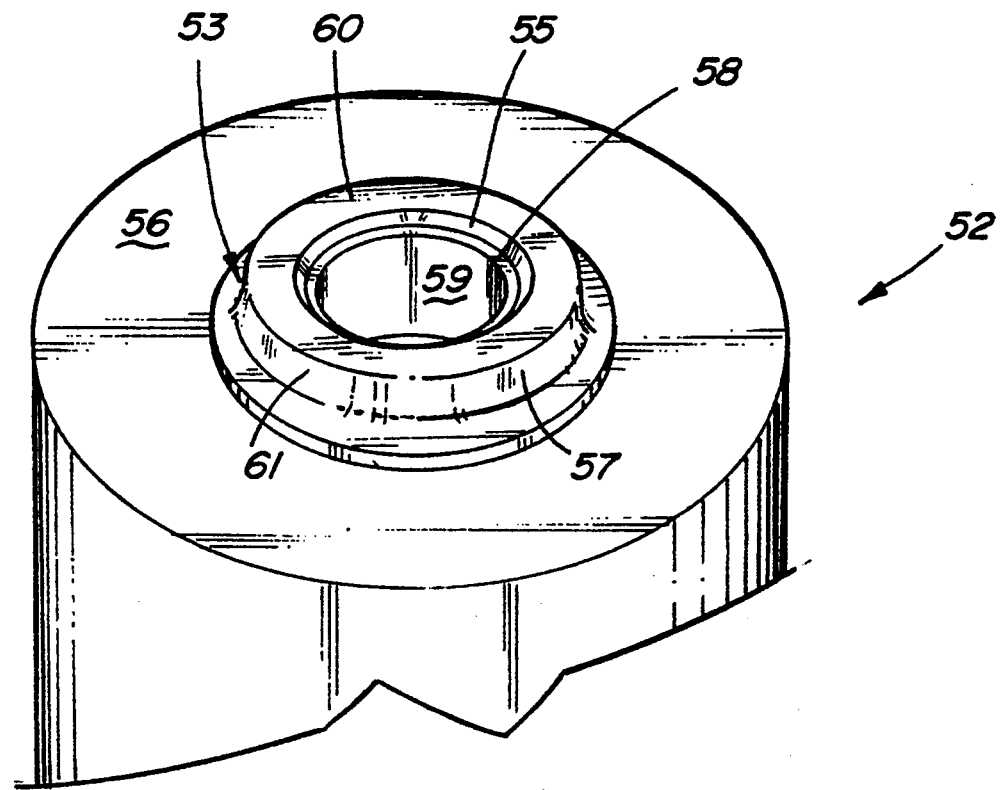
FIG. 8 is a top perspective view of one embodiment of the die member or die button of this invention.
Figure 9:
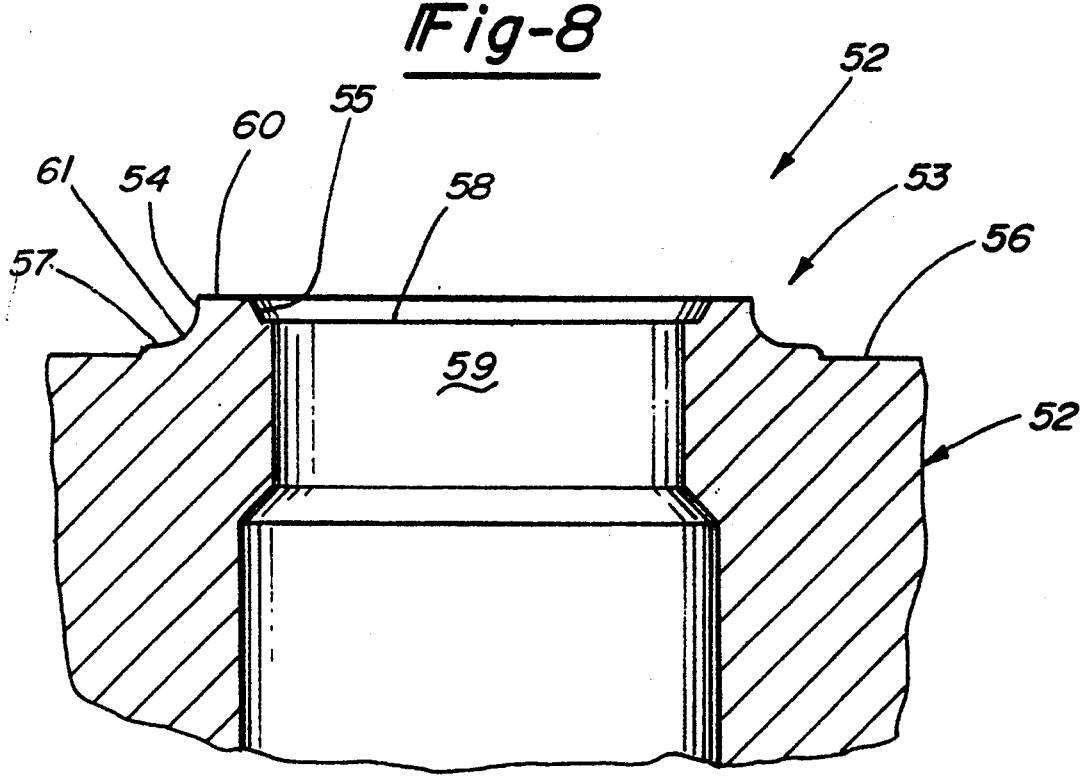
FIG. 9 is a partial cross-sectional side view of the embodiment of the die button shown in FIG. 8.

FIGS. 8 and 9 illustrate an embodiment of the improved die button 52 of this invention which may be utilized to install the pierce nuts 10 and 40 described above. The die button may be cylindrical with an annular or circular lip or protrusion 53 which is configured to be received in the circular groove 16 of the nut and deform panel metal into the groove as the nut is driven into the plate, as described below. A circular shearing or piercing edge 58 is defined on an inner surface of the bore 59, preferably spaced from the plane of the annular end face 60, such that panel metal is deformed into the groove before piercing, as described below. Also, a chamfered or angled surface 55 is provided between the piercing edge 58 and the top face 60 so that the die button pierces the metal plate such that large quantities of panel metal are driven into the circular groove of the nut, as described below. The outer surface of the annular lip includes a convex annular fillet 57 adjacent the corner 61 where the generally cylindrical outer surface 54 of the lip 53 meets the flat annular back face 56 which extends to the outside of the die button in the radial direction from the generally cylindrical outer surface 54. As will be explained below, when a pierce nut is attached to a metal panel or plate, this fillet 57 increases the quantity of panel metal deformed into the nut groove by an amount equal to the additional metal defined by the fillet.

Figure 10:
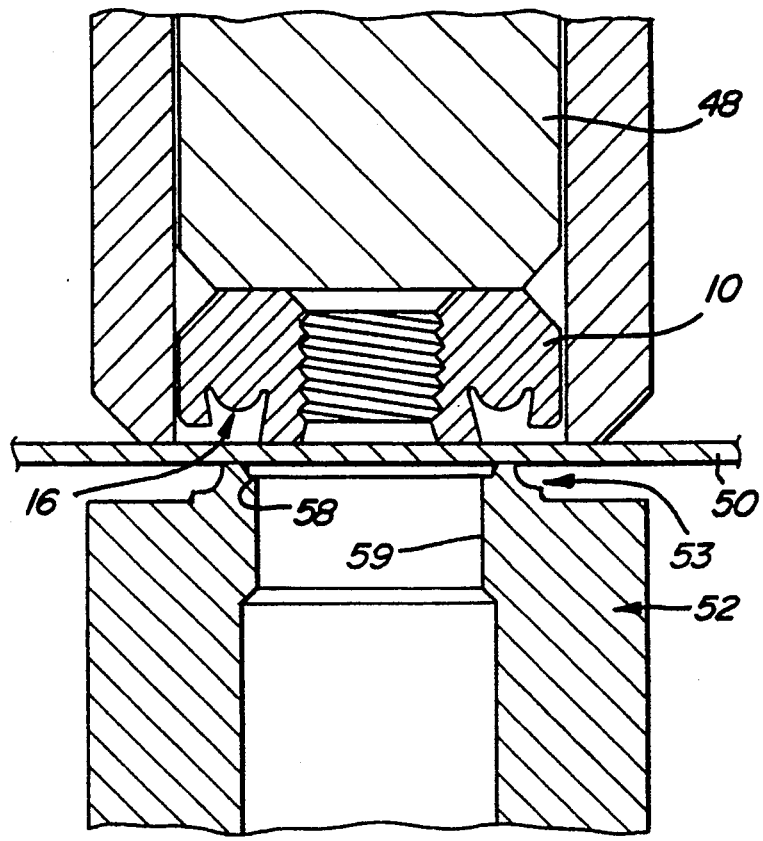
FIG. 10 is a partial cross-sectional view of the installation tooling shown in FIG. 6 with an embodiment of the pierce nut of this invention ready for installation.
Figure 11:
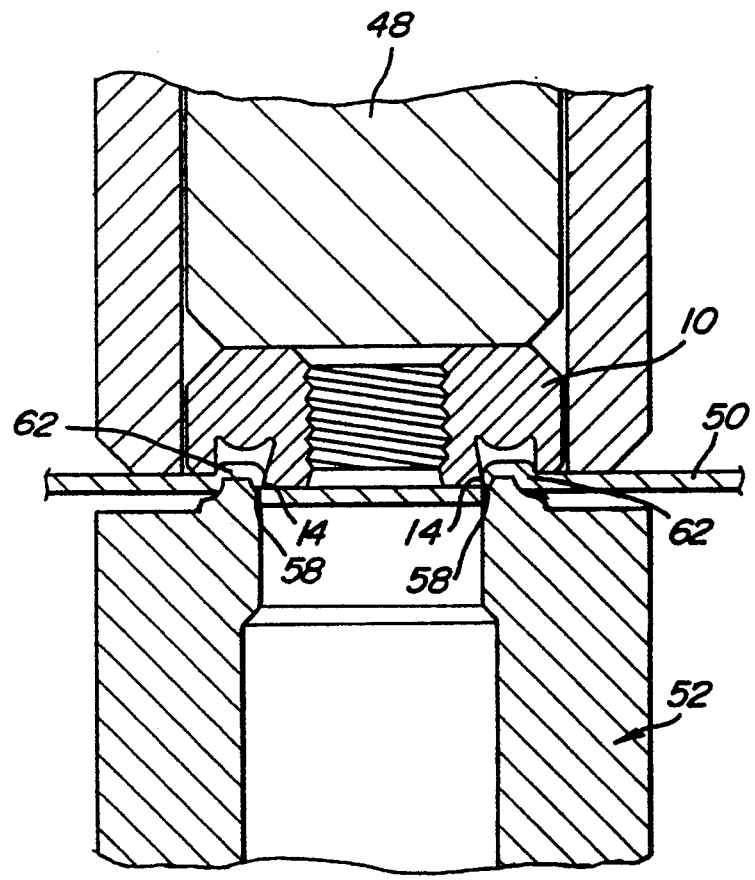
FIG. 11 is a cross-sectional view of the installation tooling of FIG. 10 with the pierce nut partially installed in the panel.
Figure 12:
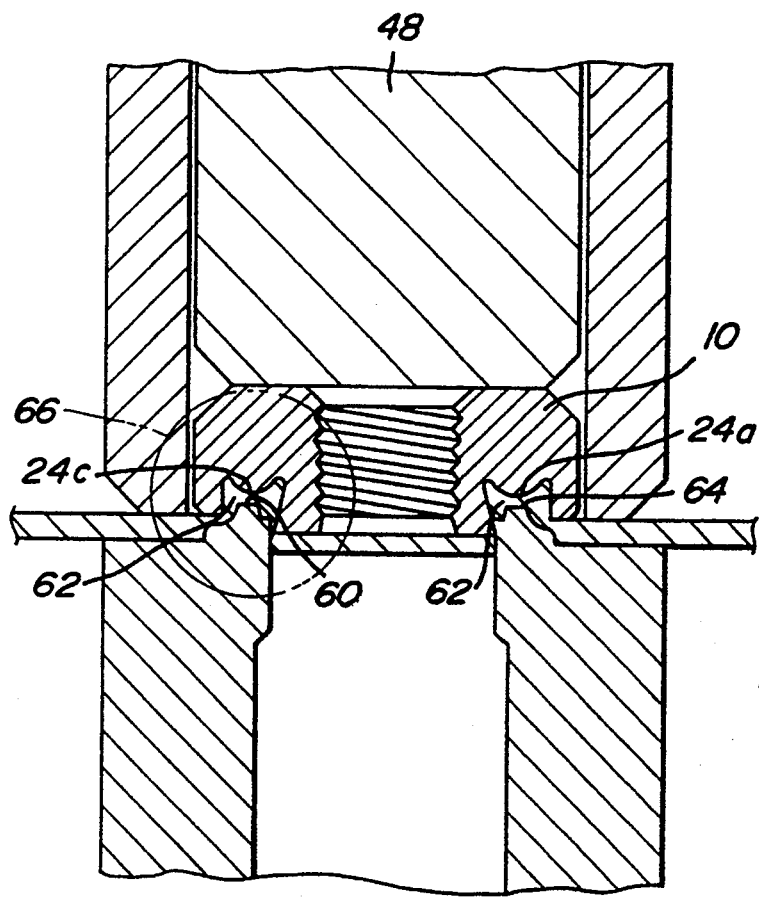
FIG. 12 is a partial cross-sectional view similar to FIGS. 10 and 11, with the pierce nut fully installed in the panel.

FIGS. 10–12 are cross-sectional views illustrating the sequence of installation as a pierce nut 10 is driven into a metal panel or plate 50 by the plunger 48 of the pierce nut installation head shown in FIG. 6. The pierce nut 10 acts in conjunction with the die button 52 to perforate or pierce the metal plate and the pierce nut is then attached to the metal plate by the die button. FIG. 10 is a cross-sectional drawing that illustrates the situation as the pierce nut 10 is pressed against the metal panel 50. As this figure indicates, the shearing edge 58 on the interior surface of the counterbore 59 of the die button is slightly angled in the shearing direction and is located below the plane of the end surface 60 of the annular lip 53. The shearing edge thus perforates or pierces the metal plate, such that it lengthens the metal plate material at the end of the perforation and draws as much metal as possible into the circular groove 16 of the pierce nut 10. FIG. 11 is a cross-sectional view taken at the time the pierce nut 10 has been driven into the metal plate 50 by the plunger 48 and the pierce nut has pierced or perforated the metal plate 50. As this figure indicates, the shearing edge 14 of the pierce nut 10 has acted in conjunction with the shearing edge 58 on the die button to pierce the metal plate 50 after an annular portion of the panel 62 around the perforation has been deformed into the circular groove 16 of the pierce nut 10.

FIG. 12 is a cross-sectional view following installation illustrating how panel metal 62 has been deformed inside the circular groove 16 and compressed between the protuberances 24a–24e on the pierce nut bottom wall. As shown, the annular end 60 of the annular lip of the die button deforms the panel metal against the protuberances, deforming the panel metal radially outwardly and inwardly against the side walls of the groove.

Figure 13:
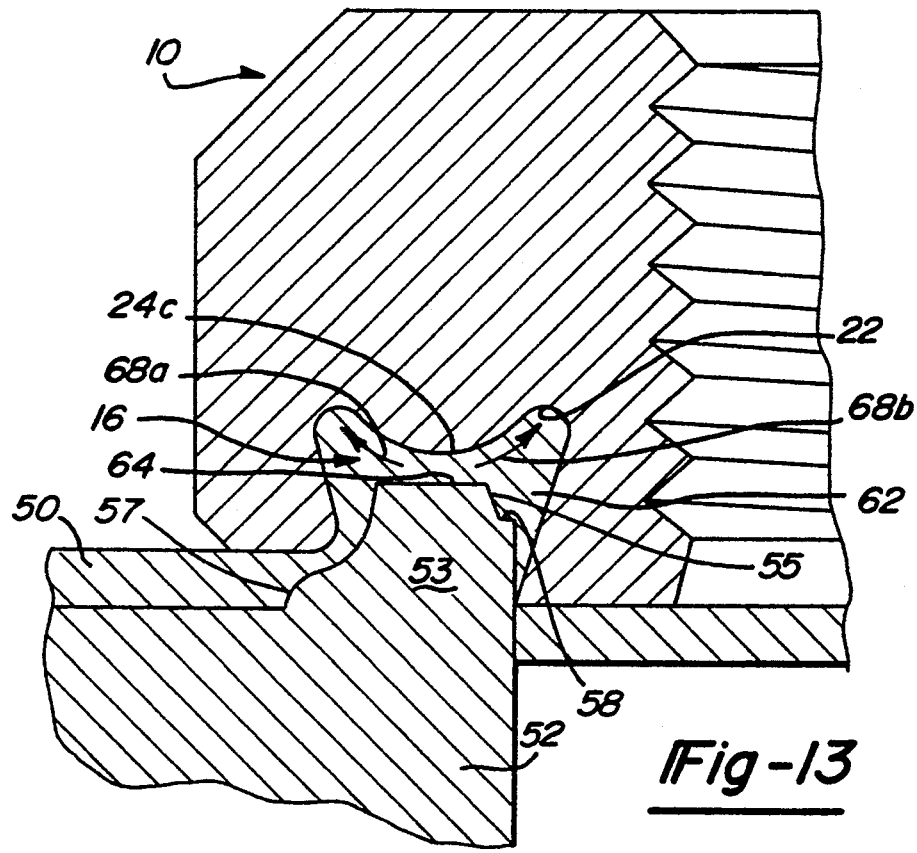
FIG. 13 is an expanded partial cross-sectional view of FIG. 12 illustrating the flow of panel metal in the groove of the pierce nut of this invention.

FIG. 13, which is an expanded cross-sectional view of the portion 66 of FIG. 12, illustrates the flow of panel metal as the annular lip 53 is driven into the annular panel portion and the panel portion 62 is deformed against the concave protuberance 24c. The annular fillet 57 and the chamfer or inclined inner wall cooperate to deform more panel metal 62 in the groove. As the panel metal is deformed against the annular protuberance 24c, the metal flows radially outwardly and inwardly along the edge of the protuberance as shown by arrows 68a and 68b. Consequently, panel metal 62 has been forced in a wedge-shape substantially all the way to the bottom 22 of the circular groove 16 beneath the inclined side walls, at the same time that substantially the entire interior surface of the circular groove is in contact with the panel metal 62, with the result that both the pull-out resistance and anti-torque resistance of the pierce nut 10 attached to the metal plate has been increased. Even where the metal plate or panel is relatively thin, it is possible to cause panel metal to flow on both sides of the protuberances and to insert panel metal in a wedge-shape beneath the inclined side walls of the groove as the entire interior surface of the circular groove 16 is brought into contact with the panel metal 62. Thus, the pull-out resistance and torque resistance of the pierce nut are increased. It may, however, be desirable to adjust the height and shape of the protuberances or the die button lip where the panel metal is particularly thin or thick. As will be understood by those skilled in the art, the protuberance 24c is used as an example for this explanation, but the explanation is also true for the other protuberances shown. Further, because substantially the entire interior surface of the circular groove 16 is in contact with panel metal 62, the water sealing function of the nut is enhanced.

As FIG. 13 illustrates, panel metal 62 around the perforation or pierced edge is deformed by the joint action of the fillet 57 and the interior wall of the groove. The panel metal facing the corner is guided into the circular groove by the shape of the fillet. As a result, a volume of panel metal equal to the cubic volume of the fillet is deformed into the groove, with the result that more panel metal is guided to the bottom surface of the groove and substantially the entire interior surface of the groove is in contact with panel metal 62.

Figure 14:
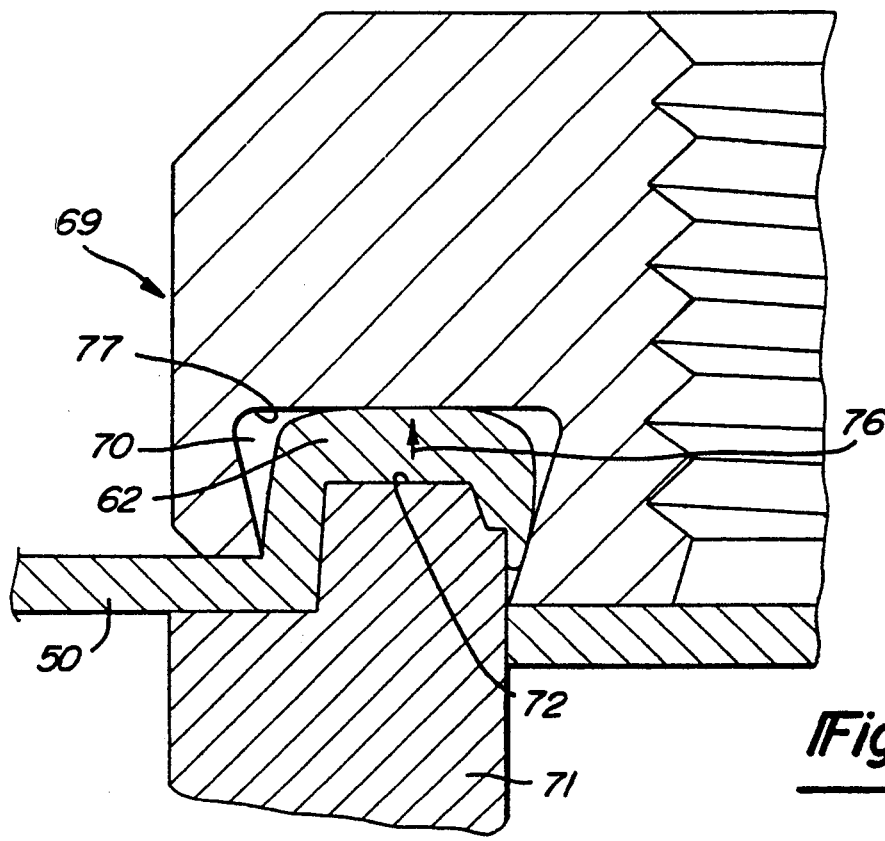
FIG. 14 is an expanded cross-sectional view of the installation of a pierce nut in a panel where the nut groove does not include an annular protuberance.

FIG. 14 illustrates the installation of a pierce nut 69 without protuberances, such that the flow of panel metal in the groove can be compared with the flow of panel metal in the nut groove illustrated in FIG. 13. When the nut does not include a protuberance in the circular groove 70, the panel metal 62 is compressed by the end 72 of the die button 71, but is deformed only in the direction indicated by arrow 76, such that only a portion of the panel metal 62 is in contact with the bottom wall 77 of the circular groove 70. The contact between the circular groove 70 and the panel metal 62 is thus relatively narrow as compared with the substantially full contact shown in FIG. 13. Thus, it is not possible to achieve the same strong pull-out and anti-torque resistance as the nut and panel assembly shown in FIG. 13.

Figure 15:
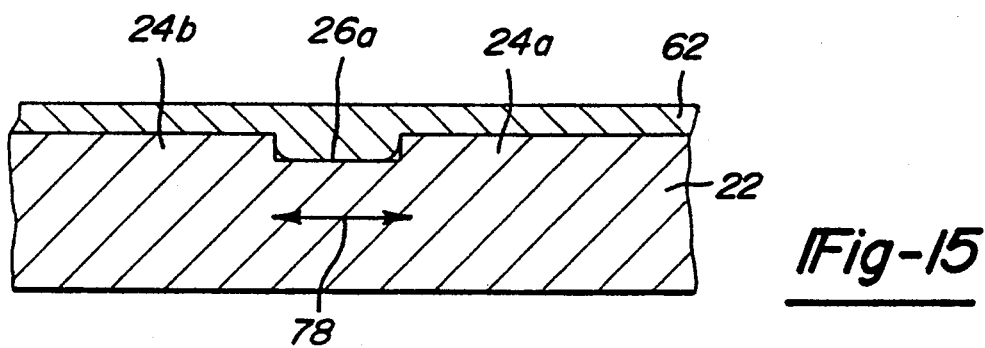
FIG. 15 is an expanded partial side cross-sectional view of a nut installed in a panel in a space between protuberances.

FIG. 15 illustrates the flow of panel metal into the spaces 26a–26d between the protuberances 24a–24d shown in FIGS. 1–3. As shown, the panel metal 62 that flows along the protuberances 24a and 24d also flows into the space 26a between the protuberances, such that the panel metal in such groove-like spaces act as a stop in the rotational direction shown by arrow 78 to further increase the rotational or torque resistance of the pierce nut 10 in the metal plate 50. The space 26a was used as an example in FIG. 13, but the same principle applies to all the spaces between the protuberances.

Figure 16:
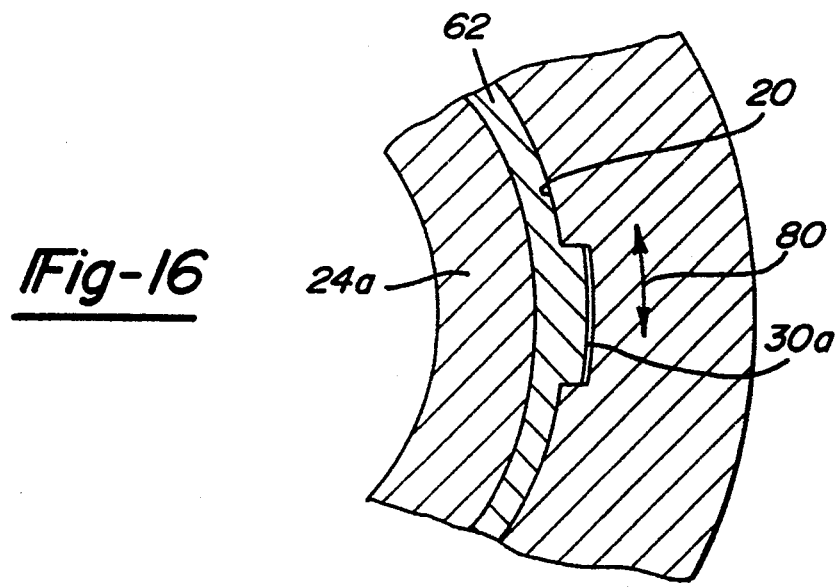
FIG. 16 is a top partial cross-sectional view of a pierce nut of this invention installed in a panel.

FIG. 16 illustrates the flow of panel metal 62 into the radial grooves or notches 30a–30d in the outer side wall 20 of the annular groove as shown in FIGS. 1–3. The panel metal 62 that flows along the protuberances also flows into step or notch 30a, such that it acts as a stop in the rotational direction as indicated by arrow 80, with the result that the rotational resistance of the pierce nut 10 on the metal plate is strengthened. The radial grooves also relieve stresses which may buildup as the groove 16 is filled or in an overhit situation. As will be understood, step 30a is used herein as an example, but the same principle applies to the other radial grooves or notches.

Experiments were conducted in which a pierce nut 10 identical to that described above was attached to metal plates using the method described above. High pull-out resistant values were obtained: 315 kg using a nut with a screw diameter of 6 mm and a plate with a thickness of 0.6 mm (compared to an earlier cylindrical pierce nut having a pull-out value of 168 kg), 300 km using the same nut size and a plate with a thickness of 0.8 mm (compared to a cylindrical pierce nut having 208 kg of pull-out resistance). Rotational resistance values were 170 kg-cm with a 0.6 mm plate, 240 kg-cm with a 0.8 mm plate and 270 kg-cm with a 1.0 mm plate.

Figure 17:
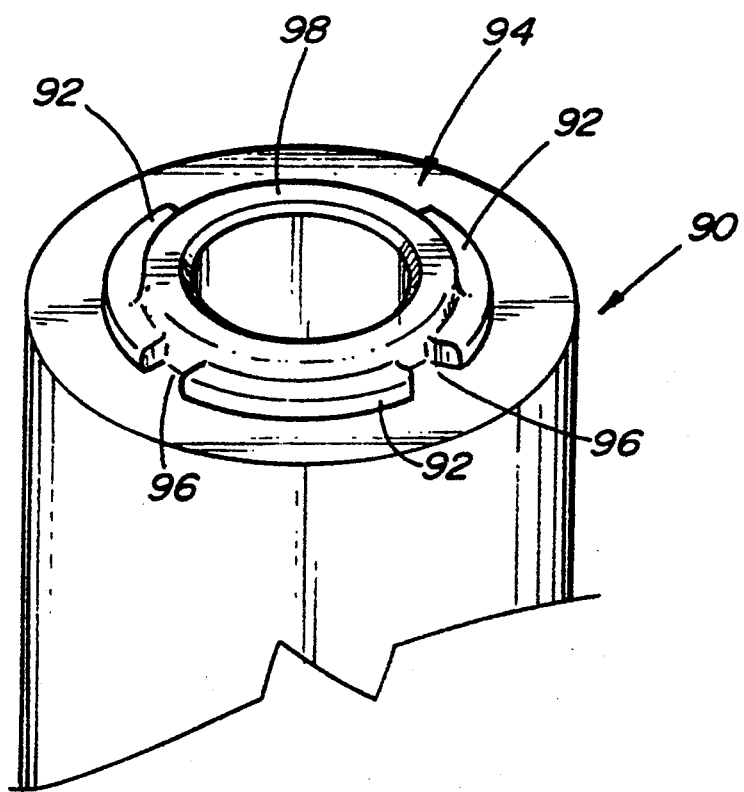
FIG. 17 is a top perspective view of an alternative embodiment of a die button of this invention.

FIG. 17 illustrates a modified die button 90 having a discontinuous annular convex fillet 92. The annular lip 94 is otherwise identical to the annular lip 53 shown in FIGS. 8 and 9. However, as a pierce nut of this invention is driven into a panel supported on the annular end 98 of the die button lip shown in FIG. 17, the panel metal received in the spaces 96 between the convex fillets 92 is not deformed and thinned at the conjunction between the outer side wall and the end face of the nut. Instead, relatively thickened panel web portions are formed at the spaces 96, increasing the overall strength of the nut and panel assembly. These spaces 96 may also provide stress relief for the panel where the die button and nut are not accurately aligned.

Having described the preferred embodiments of the self-attaching fastener or pierce nut, method of installation and installation die of this invention, it will be understood that various modifications may be made within the purview of the appended claims. For example, the dimensions of the self-attaching fastener may be modified for particular applications, including panel thickness. As described above, the self-attaching fastener of this invention is particularly adapted for permanent attachment to relatively thin panels, such as utilized for structural components in the automotive and appliance industries. Further, the pierce nut of this invention may be utilized as a self-attaching fastener on panels having prepierced or preformed panel openings; however, the utilization of the fastener disclosed as a self-piercing and clinching fastener has several advantages, including the elimination of a separate piercing step and more panel metal is deformed into the groove when the panel is pierced by the nut utilizing the improved die button of this invention, forming a more secure mechanical interlock between the nut and panel.

We claim:

1. A self-clinching nut fastener for attachment to a plastically deformable metal panel, said fastener having a central pilot portion, a flange portion surrounding said pilot portion having a generally flat annular panel-supporting end face, and an annular groove defined in said flange end face surrounding said pilot, said groove having opposed side walls and a bottom wall, at least one of said groove side walls inclined toward said opposed side wall defining a restricted opening to said groove adjacent said flange end face, and said groove bottom wall having a plurality of spaced convex annular protuberances extending at least partially around said pilot spaced from said inclined groove side wall, said protuberances directing panel metal beneath said inclined groove side wall as said panel is deformed in said groove against said bottom wall as said nut fastener is attached to said panel.

2. The self-clinching nut fastener defined in claim 1, characterized in that said groove bottom wall between said protuberances being generally flat.

3. The self-clinching nut fastener defined in claim 2, characterized in that said pilot is circular and said groove bottom wall is circular, and said plurality of spaced annular protuberances are semi-circular, extending along a mid portion of said groove bottom wall.

4. The self-clinching nut fastener defined in claim 3, characterized in that said opposed groove side walls include an inner side wall adjacent said pilot and an opposed outer side wall, said outer side wall of said groove opposite said pilot is inclined toward said opposed inner side wall and said outer side wall including a plurality of radial grooves opposite said pilot.

5. The self-clinching nut fastener defined in claim 4, characterized in that said radial grooves each have an outside wall opposite said pilot extending generally perpendicular to said groove bottom wall.

6. The self-clinching nut fastener defined in claim 1, characterized in that said groove opposed side walls are both inclined inwardly relative to said bottom wall and said side walls converging to define a restricted groove opening adjacent said flange end face, one of said side walls including a plurality of spaced radial grooves opposite said pilot.

7. The self-clinching nut fastener defined in claim 1, characterized in that said annular protuberances comprises a plurality of spaced semi-circular protuberances in said groove bottom wall each extending along an arc surrounding said pilot spaced from one of said side walls and said groove side wall opposite said pilot including a plurality of generally equally-spaced radial grooves generally opposite said semi-circular protuberances.

8. A self-clinching nut fastener for attachment to a plastically deformable metal panel, said fastener having a projecting central pilot portion having an end face, a central bore extending through said pilot generally perpendicular to said pilot end face, a flange portion surrounding said pilot having a generally flat annular panel-supporting end face spaced from the plane of said pilot end face, and an annular groove defined in said flange end face adjacent to and surrounding said pilot, said groove having a bottom wall and opposed side walls including an inner side wall defining an outer surface of said pilot and an inclined outer side wall opposite said inner side wall, said groove side walls converging to define a restricted opening to said groove adjacent said flange end face, said pilot end face having an annular panel piercing edge adjacent said groove, and said groove bottom wall having a plurality of spaced arcuate convex annular protuberances extending at least partially around said pilot spaced from said inclined outer side wall, said protuberances directing panel metal beneath said inclined outer side wall as said panel is deformed in said groove against said bottom wall.

9. The self-clinching nut fastener defined in claim 8, characterized in that said bottom wall between said spaced arcuate protuberances being generally flat.

10. The self-clinching nut fastener defined in claim 9, characterized in that said outer side wall of said groove includes spaced radial grooves opposite said pilot.

11. The self-clinching nut fastener defined in claim 10, characterized in that said radial grooves extend generally perpendicular to said groove bottom wall.

12. The self-clinching nut fastener defined in claim 8, characterized in that said annular protuberance comprises a plurality of spaced arcuate protuberances and said outer side wall having a plurality of spaced radial grooves generally opposite said arcuate protuberances.

13. The self-clinching nut fastener defined in claim 12, characterized in that said inner groove side wall is inclined relative to said bottom wall toward said inclined outer side wall and said protuberances are spaced from said inclined inner side wall.

14. A self-piercing and clinching nut fastener for attachment to a plastically deformable metal panel, said fastener having a central pilot having an end face and a central bore extending through said end face generally perpendicular to said end face, a flange portion surrounding said pilot having a generally flat annular panel-supporting end face and an annular groove defined in said flange end face adjacent to and surrounding said pilot, said groove having a bottom wall and opposed side walls including an inner side wall defining an outer surface of said pilot and an outer side wall opposite said groove inner side wall, said pilot end face including an outer piercing edge for piercing a hole in said panel as said nut is attached to said panel, said groove bottom wall having a convex annular protuberance extending at least partially around said pilot spaced from said groove side walls, said protuberance directing panel metal against said side walls as said panel is deformed in said groove against said groove bottom wall, and said groove outer side wall including a plurality of spaced radial grooves.

15. The self-piercing and clinching nut fastener defined in claim 14, characterized in that said groove bottom wall is generally circular, said protuberance comprising a plurality of spaced semi-circular protuberances, said bottom wall between said semi-circular protuberances being generally flat and said radial grooves located opposite said protuberances.

16. The self-piercing and clinching nut fastener defined in claim 15, characterized in that said outer side wall is inclined relative to said bottom wall converging toward said inner side wall to define a restricted opening to said groove adjacent said flange end face and said radial grooves extending generally perpendicular to said bottom wall.

17. A nut and panel assembly, including a plastically deformable metal panel and a self-clinching nut fastener, said nut fastener having a projecting central pilot portion including an end face and a central bore extending through said pilot generally perpendicular to said end face, a flange portion surrounding said pilot having an annular end face spaced from a plane of said pilot end face supporting an annular portion of said panel, an annular groove defined in said flange end face of said nut fastener adjacent to and surrounding said pilot, said groove having a bottom wall and opposed side walls, said side walls including an inner side wall defining an outer surface of said pilot and an outer side wall opposite said inner side wall, and said nut fastener groove bottom wall having a convex annular protuberance extending at least partially around said pilot spaced from said groove side walls directing panel metal against said side walls as said panel is deformed in said annular groove against said bottom wall, and said panel having an annular portion deformed in said groove against said groove bottom wall protuberance and radially against said groove side walls, forming a secure mechanical interlock between said panel and said nut fastener.

18. The nut and panel assembly defined in claim 17, characterized in that said annular protuberance comprises a plurality of spaced arcuate protuberances with the bottom wall between said protuberances being generally flat, said panel deformed against said bottom wall and said spaced arcuate protuberances.

19. The nut and panel assembly defined in claim 17, characterized in that at least one of said groove side walls is inclined toward said opposed side wall defining a restricted opening to said groove adjacent said flange end face and said panel deformed against said inclined side wall retaining said panel portion in said groove.

20. A nut and panel assembly comprising a self-clinching nut fastener and a plastically deformable metal panel, said nut fastener including a central pilot portion having an end face and a bore extending through said pilot generally perpendicular to said end face, a flange portion surrounding said pilot portion having a flat annular panel-supporting end face spaced from the plane of said pilot portion end face and an annular groove defined in said flange end face adjacent to and surrounding said pilot portion, said groove having a bottom wall and opposed side walls including an inner side wall defining an outer surface of said pilot and an inclined outer side wall opposite said inner side wall, said side walls converging to define a restricted opening to said groove adjacent said flange portion annular end face, and said groove bottom wall having a plurality of spaced convex annular protuberances extending around said pilot spaced from said inclined groove outer side wall, said panel having an opening receiving said pilot, a first annular panel portion supported on said flange portion end face and a second annular portion adjacent said panel opening deformed in said nut fastener groove against said bottom wall protuberances and radially outwardly against said groove outer side wall forming a secure mechanical interlock between said panel nut fastener.

21. A nut and panel assembly comprising a self-clinching nut fastener and a plastically deformable metal panel, said nut fastener including a central pilot portion having an end face and a bore extending through said pilot generally perpendicular to said end face, a flange portion surrounding said pilot portion having a flat annular panel-supporting end face spaced from the plane of said pilot portion end face and an annular groove defined in said flange end face adjacent to and surrounding said pilot portion, said groove having a bottom wall and opposed side walls including an inner side wall defining an outer surface of said pilot and an inclined outer side wall opposite said inner side wall, said side walls converging to define a restricted opening to said groove adjacent said flange portion annular end face, and said groove bottom wall having a convex annular protuberance extending at least partially around said pilot spaced from said inclined groove outer side wall, said panel having an opening receiving said pilot, a first annular panel portion supported on said flange portion end face and a second annular portion adjacent said panel opening deformed in said nut fastener groove against said bottom wall protuberance and radially outwardly against said groove outer side wall forming a secure mechanical interlock between said panel and said nut fastener.

22. The nut and panel assembly defined in claim 21, characterized in that said flange bottom wall is generally flat between said protuberances, said second panel portion deformed against said bottom wall and said protuberances.

23. The nut and panel assembly defined in claim 22, characterized in that said groove outer side wall including a plurality of spaced radial grooves, said radial grooves located generally opposite a mid portion of each of said arcuate protuberances, and said panel deformed radially into said groove outer side wall radial grooves.

24. A method of attaching a self-clinching nut fastener to a plastically deformable metal panel, said nut fastener including a projecting central pilot portion having an end face, a flange portion surrounding said pilot having a generally flat annular panel-supporting end face, and an annular groove defined in said flange end face adjacent to and surrounding said pilot, said groove having a bottom wall and opposed side walls, said side walls including an inner side wall defining an outer surface of said pilot and an outer side wall opposite said inner side wall, and said bottom wall having a convex annular protuberance extending at least partially around said pilot, said method comprising the following steps:

(a) supporting said panel on a die member having a projecting annular male die lip portion, including an annular central end face surrounding by a generally cylindrical outer surface, said male die lip portion configured to be received within said nut annular groove, and said method including aligning said nut fastener opposite said die member with said groove coaxially with said die member male die lip portion;

(b) driving said die member male die lip portion against said panel, deforming an annular portion of said panel into said fastener annular groove and against said groove bottom wall convex annular protuberance;

(c) continuing to drive said die member male die portion against said panel portion and said annular panel portion against said annular protuberance, said protuberance deforming said panel portion radially inwardly and outwardly against said groove opposed side walls forming a secure mechanical interlock between said nut fastener and said panel.

25. The method of attaching a self-clinching nut fastener to a plastically deformable metal panel as defined in claim 24, wherein at least one of said groove side walls is inclined toward said opposed side wall defining a restricted opening to said groove adjacent said flange end face, said method including driving said panel portion against said annular protuberance, said annular protuberance deforming said panel portion beneath said inclined side wall, thereby forming a more secure interlock between said panel portion and said nut fastener.

26. The method of attaching a self-clinching nut fastener to a plastically deformable metal panel as defined in claim 25, wherein said outer side wall is inclined inwardly relative to said bottom wall and said outer side wall includes a plurality of spaced radial grooves, said method including deforming said panel portion into said radial grooves.

27. The method of attaching a self-clinching nut fastener to a plastically deformable metal panel as defined in claim 24, wherein said outer side wall of said nut groove is inclined radially inwardly to define a restricted opening to said groove adjacent said flange panel-supporting end face and said groove outer side wall including a plurality of spaced radial grooves, said method including driving said panel against said convex annular protuberance, said protuberance deforming said panel portion beneath said inclined outer side wall and continuing to drive said male die portion into said groove, deforming said panel portion into said radial grooves.

28. The method of attaching a self-clinching nut fastener to a plastically deformable metal panel as defined in claim 27, wherein said protuberance comprises a plurality of spaced arcuate protuberances, said groove bottom wall between said arcuate protuberance being generally flat and said radial grooves in said outer wall located opposite an arcuate protuberance, said method including driving said panel portion against said arcuate protuberances and said protuberances deforming said panel metal radially outwardly into said radial grooves.

29. The method of attaching a self-clinching nut fastener to a plastically deformable metal panel as defined in claim 24, wherein said die member lip includes a convex annular step having an outside diameter greater than an inside diameter of said nut groove inner side wall, said method including continuing to drive said die member lip convex annular step into said panel portion, thereby deforming additional panel metal into said nut groove.

30. A method of attaching a self-piercing and clinching nut fastener to a plastically deformable metal panel, said fastener including a projecting central pilot portion having a generally end face, a central bore extending through said nut fastener, generally perpendicular to said end face, a flange portion surrounding said pilot having a generally flat annular panel-supporting end face, and an annular groove defined in said flange end face adjacent to and surrounding said pilot, said groove having a bottom wall and opposed side walls, said side walls including an inner side wall defining an outer surface of said pilot and an outer side wall opposite said inner side wall, and said groove bottom wall having a convex annular protuberance extending at least partially around said pilot, said method comprising the following steps:

(a) supporting said panel on a die member having a projecting annular male die lip portion surrounding a central bore, said lip portion having an annular central end face surrounded by a generally cylindrical outer surface, said male die lip portion configured to be received within said nut annular groove, said method including supporting said panel on said male die lip portion central end face with said lip portion coaxially aligned with said nut annular groove;

(b) driving said nut fastener pilot portion end face against said panel, said lip portion end face driving an annular portion of said panel into said nut groove;

(c) continuing to drive said nut member pilot end face against said panel, causing an outer surface of said nut pilot and an inner surface of said die member bore to pierce a slug from said panel, receiving said projecting pilot end face through the pierced panel opening; and (d) continuing to drive said nut member against said panel causing said die member annular lip end face to drive an annular portion of said panel surrounding said pierced opening into said annular nut groove against said convex annular protuberance, deforming said panel portion radially inwardly and outwardly against said groove opposed side walls forming a secure mechanical interlock between said nut fastener and said panel.

31. The method of attaching a self-piercing and clinching nut fastener to a plastically deformable metal panel as defined in claim 30, wherein said die member includes a generally circular shearing edge adjacent said bore spaced from the plane of said annular male die lip portion central end face and said nut fastener pilot portion end face having an outside diameter generally equal to the inside diameter of said circular shearing edge, said method including driving said nut fastener pilot end face against said panel, causing said projecting annular male die lip portion to deform panel metal into said nut annular groove, then said outer surface of said nut fastener cooperating with said shearing edge to shear a slug from said panel and receive said pilot in said die member bore through the opening pierced in said panel.

32. The method of attaching a self-piercing and clinching nut fastener to a plastically deformable metal panel as defined in claim 31, wherein said nut fastener groove outer side wall is inclined inwardly relative to said bottom wall toward said inner side wall and said outer side wall including a plurality of spaced radial grooves, said method including deforming said panel portion into said radial grooves.

33. The method of attaching a self-piercing and clinching nut fastener as defined in claim 30, wherein said nut fastener groove inner and outer side walls are inclined relative to said bottom wall defining a restricted opening to said groove adjacent said flanged end face, said method including driving said panel against said protuberance and said protuberance deforming said panel portion radially inwardly and outwardly against said groove opposed side walls beneath said inclined side walls.

34. The method of attaching a self-piercing and clinching nut fastener as defined in claim 30, wherein said die member lip includes a convex annular step having an outside diameter greater than an inside diameter of said nut groove inner side wall, said method including continuing to drive said die member lip convex annular step into said panel portion, thereby deforming additional panel metal into said nut groove.

* * * * *

UNITED STATES PATENT AND TRADEMARK OFFICE
CERTIFICATE OF CORRECTION

PATENT NO. : 5,340,251
DATED : August 23, 1994
INVENTOR(S) : Takao Takahashi, Hiroshi Takehara It is certified that error appears in the above-indentified patent and that said Letters Patent is hereby corrected as shown below:

Column 14, line 64, after "coaxially" insert --aligned--

Signed and Sealed this

Twenty-ninth Day of November, 1994

Attest:

BRUCE LEHMAN

Attesting Officer     Commissioner of Patents and Trademarks